United States Patent [19]

Palm

[11] 4,400,995
[45] Aug. 30, 1983

[54] SPINDLE LOCK WITH IMPACTING CAPABILITY

[75] Inventor: Bernhard Palm, Brookfield, Wis.

[73] Assignee: Milwaukee Electric Tool Corporation, Brookfield, Wis.

[21] Appl. No.: 304,852

[22] Filed: Sep. 23, 1981

[51] Int. Cl.³ .......................... G05G 5/06; B24B 23/00
[52] U.S. Cl. .................................... 74/527; 51/170 T; 173/164; 279/1 K; 408/241 R; 81/464; 188/69
[58] Field of Search ........... 51/170 T, 170 R, 170 PT, 51/168; 74/411.5, 527; 173/164, 48, 163; 279/1 R, 1 K; 408/241; 188/69; 81/464

[56] References Cited

U.S. PATENT DOCUMENTS

| | | | |
|---|---|---|---|
| 1,270,808 | 7/1918 | Franklin | 51/170 T |
| 2,211,216 | 8/1940 | Oster | 51/170 PT |
| 2,267,781 | 12/1941 | Albertson | 51/170 T |
| 2,807,732 | 9/1957 | Kurtovich | 173/164 |
| 3,021,723 | 2/1962 | Happe | 74/411.5 |
| 3,872,951 | 3/1975 | Hastings, Jr. | 279/1 K |
| 3,899,852 | 8/1975 | Batson | 74/411.5 |
| 4,358,230 | 11/1982 | Rohlin | 279/62 |

FOREIGN PATENT DOCUMENTS 3018775  11/1981  Fed. Rep. of Germany .... 51/170 R

Primary Examiner—Roscoe V. Parker
Attorney, Agent, or Firm—Bayard H. Michael

[57] ABSTRACT

The power tool has a spindle lock member rotating with the output spindle with a blocking member normally rotating with the lock member but capable of being restrained against rotation. The blocking member extends beyond the lock member and is provided with an opening through which the lock pin can project if the blocking member is at rest or rotating slowly but the opening precludes lock pin entry at normal operation speeds. The lock member has a recess of substantial angular embrace so the ends of the recess can be impacted on the lock pin.

12 Claims, 23 Drawing Figures

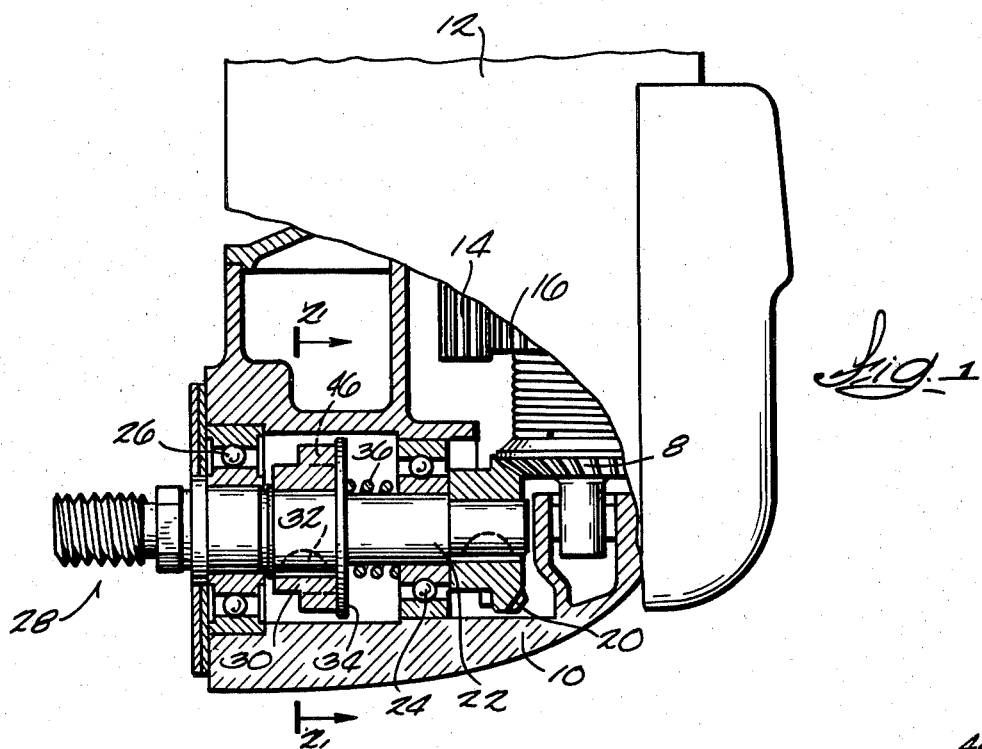
Fig. 1
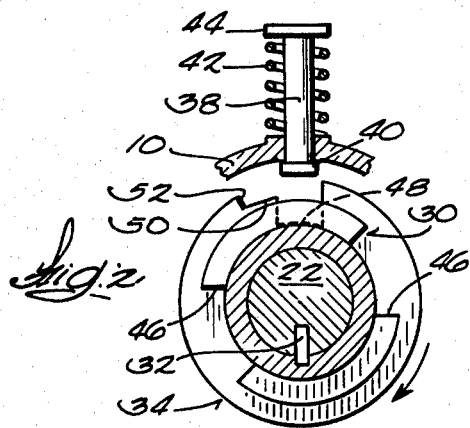
Fig. 2
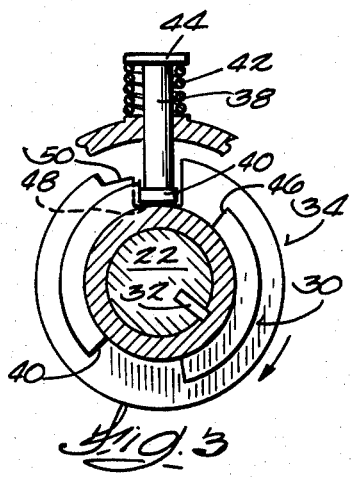
Fig. 3
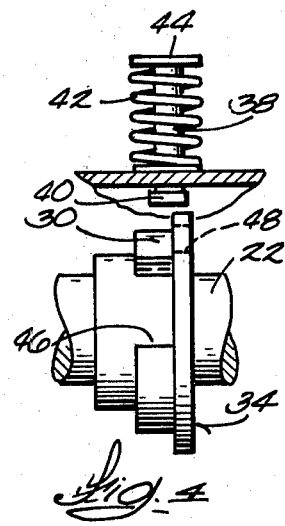
Fig. 4
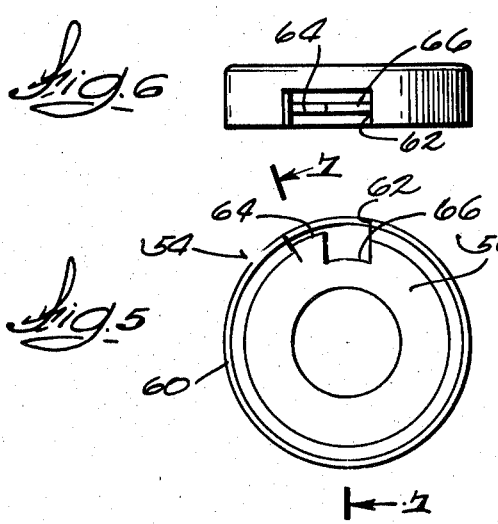
Fig. 5
Fig. 6
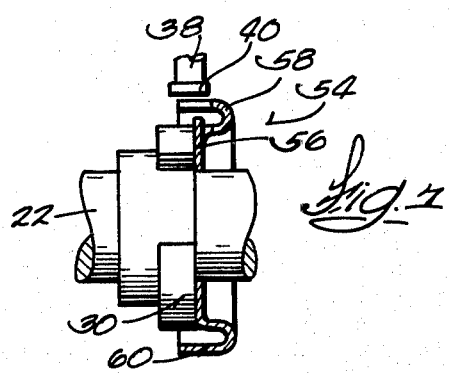
Fig. 7

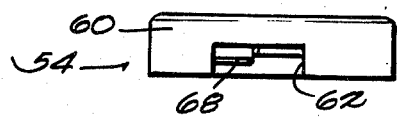
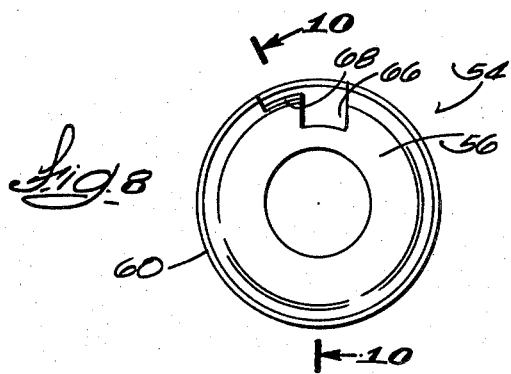
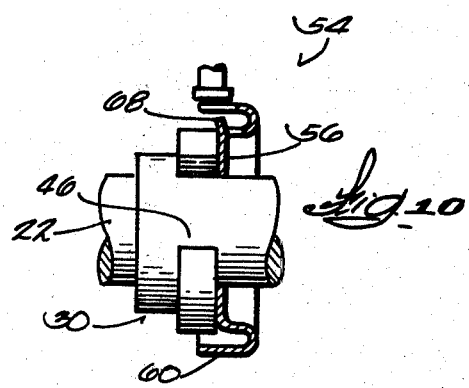
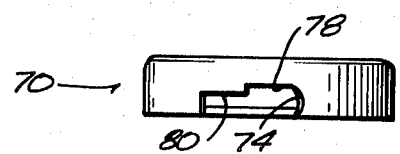
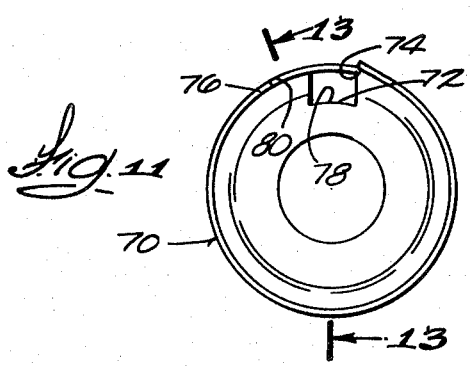
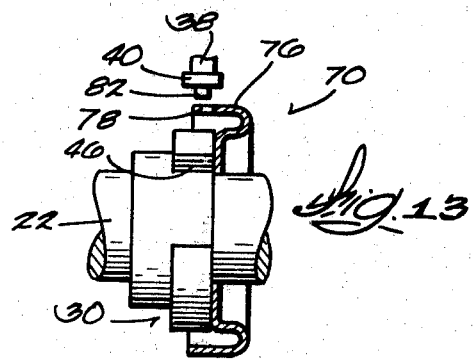
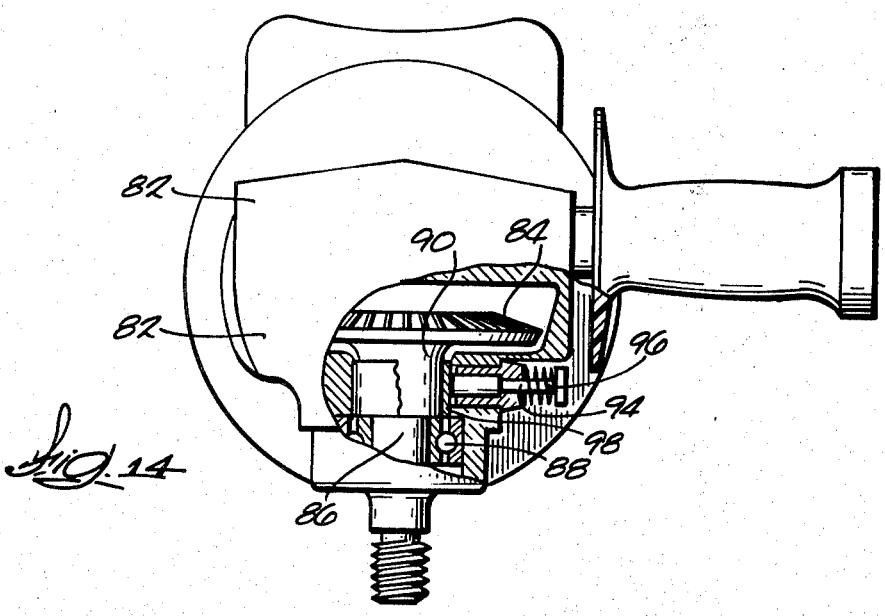

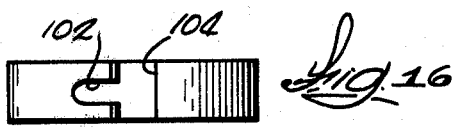
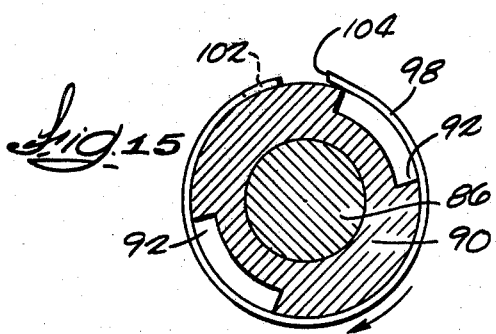
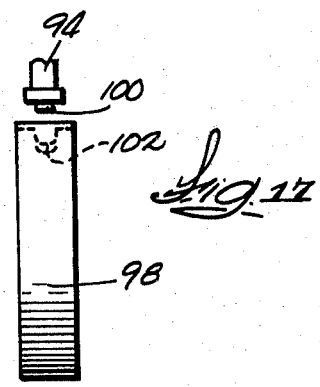
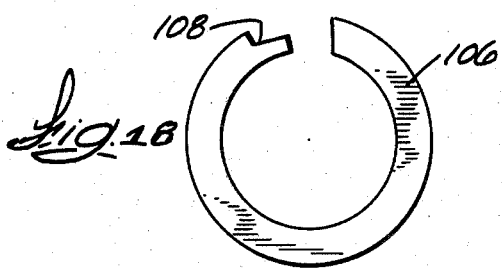
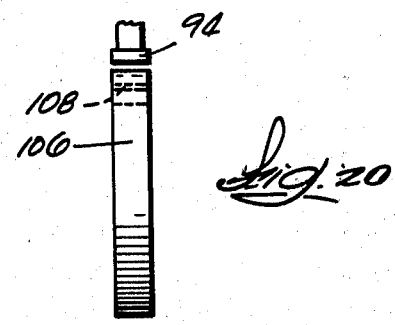
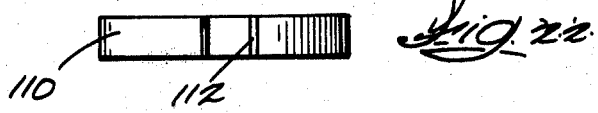
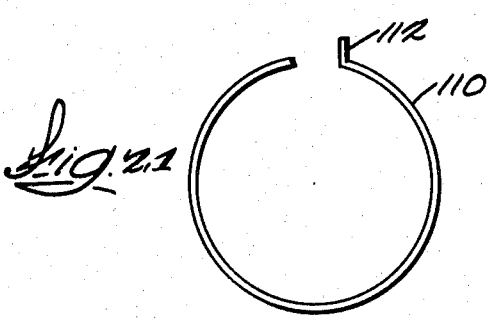
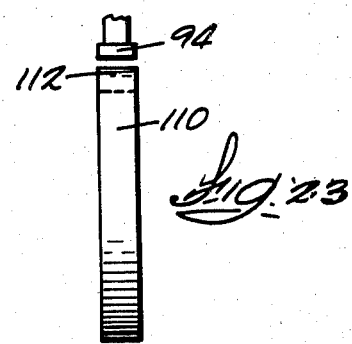

SPINDLE LOCK WITH IMPACTING CAPABILITY

TECHNICAL FIELD OF THE INVENTION

This invention relates to a power tool spindle lock which provides impacting capability.

BACKGROUND OF THE INVENTION

Power tools such as sanders, grinders and polishers are usually equipped with a spindle lock to prevent rotation of the output spindle while mounting or removing the wheels or discs. The lock pin is designed so it can be engaged only when the spindle is stopped or rotating substantially below operating speed. Engagement at operational speeds is prevented by having the hole engaged by the pin only slightly larger than the pin so the pin cannot be aligned with and pushed into the hole at high speed ... there just is not enough time. When the pin is engaged only 1 or 2 degrees of spindle rotation is possible. The torque required to remove a disc or wheel generally requires use of a wrench and restraint of the tool to take up the reaction—all while holding the lock pin engaged.

If the pin engaged in a substantially larger "hole", the spindle could then be manually rotated to impact on the pin and facilitate removal (mounting) of the accessory without wrenches or having to restrain the tool. But the pin would then enter the hole at operational speeds with serious damage to the tool.

SUMMARY OF THE INVENTION

The object of this invention is to provide a spindle lock with impacting capability and means preventing engagement of the spindle lock when the spindle rotates at potentially damaging speeds. The preventing means comprises a blocking member which prevents engagement of the lock pin with an enlarged recess in the lock collar when the spindle is rotated forward at damaging speeds. When the spindle is rotated in reverse at low speed (manual rotation) the blocking member allows the lock pin to enter the recess and the impacting capability of the spindle lock can be used in mounting or removing accessories without use of wrenches or other tools. Thus, the removal of accessory discs wheels or pads is made easier.

BRIEF DESCRIPTION OF THE DRAWINGS

FIG. 1 is a partial vertical section through a power tool showing the drive train from the motor to the spindle provided with a blocking member.

FIG. 2 is a somewhat schematicized section taken on line 2—2 of FIG. 1 showing the relationship of the lock pin to the blocking member and the spindle lock.

FIG. 3 is similar to FIG. 2 but shows the lock pin engaged with the recess in the spindle lock.

FIG. 4 is a partial and somewhat schematic vertical section through FIG. 2 showing the relationship of the lock pin, the blocking member and the spindle lock.

FIGS. 5, 6 and 7 show a modified construction and are respectively vertical and top plan views and a vertical section of a somewhat schematic representation of this construction.

FIGS. 8, 9 and 10 are similar views of another modification of this construction.

FIGS. 11, 12 and 13 show still another modification and are similar to the arrangement of the views in the prior two modifications.

FIG. 14 is a vertical elevation partly in section of another type of power tool in which the spindle lock is on the hub section of a gear mounted on the spindle and is provided with a blocking member of modified construction which is shown in FIGS. 15, 16 and 17. These latter views show only the elevation, top plan and vertical section of the blocking piece itself with FIG. 17 including the configuration of the end of the lock pin.

FIGS. 18, 19 and 20 show another modification of the type of blocking piece which can be used in the construction shown in FIG. 14.

FIGS. 21, 22 and 23 are views similar to the prior modifications but show still another construction.

DETAILED DESCRIPTION OF THE DRAWINGS

FIG. 1 serves to orient the present invention in a power tool which is a sander or polisher having a housing 10 in which motor 12 has an output shaft provided with a pinion 14 driving gear 16 which in turn drives bevel gear 18 through a clutch arrangement not important here. Bevel gear 18 in turn drives bevel gear 20 keyed to spindle 22. Spindle 22 is rotatably mounted in bearings 24, 26 and has a threaded end 28 projecting from the housing. The disc pad or other accessory is threaded onto the end 28.

Spindle lock 30 is keyed to spindle 22 by means of key 32. Generally annular blocking member 34 is mounted on spindle 22 above the spindle lock and is urged into frictional engagement with the spindle lock by spring 36 compressed between the blocking member and the inside race of bearing 24. With this spring load the blocking member tends to rotate with the spindle lock but slippage can occur.

The lock pin 38 (FIGS. 2-4) is reciprocably mounted in an aperture in housing 10 and has an enlarged head 40 on the inside of the housing preventing the pin from moving out of the housing under influence of the biasing spring 42 compressed between the housing and the underside of the enlarged head 44 of the pin.

The spindle lock 30 is provided with two diametrically opposed recesses 46 which extend anywhere between 60°-90° around the lockout. One or more than two recesses 46 could be employed. Pin 38 can (ignoring, for the moment, the presence of the lockout) be depressed to project into the recess. At this time the spindle can rotate relative to the pin within the range of 60°-90° (depending on the scope of the recess 46) less the diameter of the lock pin to permit the spindle to be rotated manually through this free movement range to build up inertia which will translate into an impact when the end of the recess is reached. With this capability an accessory, such as a sanding disc, can be easily removed by impacting against the end of the recess to free up the tight fit of the disc on the spindle threads as usually encountered in operation of the tool.

If it was possible to project the lock pin into the recess at relatively high speed, the resulting impact would bend the lock pin and the tool would require repair. Blocking member 34 is provided to prevent this from happening. The blocking member in FIGS. 1-4 has a major diameter which is slightly greater than the diameter of the spindle lock. The spindle lock and blocking member rotate in the direction of the arrow shown in FIGS. 2 and 3, that is, clockwise. As shown in FIG. 2 there is a cutout 48 at the "12 o'clock" position which is wide and deep enough to permit the pin 38 to enter all the way to the bottom of the cutout and this depth generally corresponds to the depth of the recess 46 in the spindle lock. Progressing counterclockwise from the cutout 48 there is a blocking surface 50 which slopes upward slightly to the radial face 52 which rises to the major diameter of the blocking member.

The blocking member normally will rotate at the same speed as the spindle lock. If the lock pin is depressed under normal operational speeds, it will first engage the major outside surface of the blocking member and when the recess 48 rotates under the pin, the pin just cannot drop into the recess 48 fast enough given the fact that the rotational speed is substantial. Therefore, the pin will move onto the blocking surface 50 and engage the face 52. This stops the blocking member while the spindle continues to rotate. The lock pin cannot be pressed down further and all danger is avoided. If the tool is now allowed to come to rest and is manually rotated in a reverse direction and the blocking member will rotate counterclockwise with the spindle and move blocking surface 50 out from under the pin whereupon the pin will drop onto the perimeter of the spindle lock. When the recess in the spindle lock moves under the pin the pin can enter the recess while at the same time entering the deep cut 48 in the blocking member.

The construction described thus far has a machined or stamped blocking member which requires the lock pin to engage both the blocking member and the spindle lock as best seen in FIG. 4. There is a remote chance that there might be some camming action of the lockout piece although this is not too likely. However, the construction shown in FIGS. 5, 6 and 7 eliminates this possibility through the use of the stamped and formed blocking member 54. This blocking member has a central annular portion 56 bent back towards the bearing 24 and having a reverse bend 58 providing a skirt 60 projecting over the spindle lock. Skirt 60 has a notch 62 permitting access to the blocking surface 64 formed from the annular portion 56 and to the notch 66 in the annular portion which receives the lock pin at full depression when it is in engagement with the recess 46 in the spindle lock. With this arrangement when the lock pin 38 is depressed at rotational speed it will simply drop onto blocking surface 64 as in the first modification. In reverse rotation at manual rotation speeds, the pin will engage the right hand radial wall (FIG. 5) of notch 66 to stop rotation of the blocking member 54 until the proper alignment with the recess 46 in spindle lock occurs and the pin can be fully depressed.

The construction shown in FIGS. 8, 9 and 10 is quite similar to that described with respect to FIGS. 5, 6 and 7 except that here the blocking member 54 has a tab 68 bent to project over the spindle lock 30 so as to be in a better blocking position underlying the center of the lock pin. The operation of this construction is the same as the prior modification.

It will be appreciated that the two modifications just described place the blocking surfaces of the blocking member more squarely under the centerline of the lock pin and, therefore, eliminate any possibility of camming the blocking member to an inoperative position.

In the modification shown in FIGS. 11-13, the blocking member 70 is similar to that described with respect to the two prior modifications but here, as may be seen in FIGS. 11 and 12, there is no step portion adjacent the notch 72 in the lockout but the notch 74 in the axially extending skirt 76 is stepped. The deep portion 78 of the notch 74 is aligned with the deep radial cut 72. The shallow notch portion 80 can only receive the small diameter tip 82 of the lock pin 38 for stopping the blocking member if engaged at high speed. On manual reverse rotation the lock pin will hit the humped leading edge of the deep notch 78 and the large diameter of the lock pin can now clear the lockout and drop down to the full depth of the cutout 72 and engage with the recess in the spindle lock. The skirt portion adjacent the shallow notch 80 functions as the blocking surface in this modification.

Some power tools do not use the drive train described with respect to FIG. 1 but, as illustrated in FIG. 14, use a motor, preferably on the axis of the housing 82 of the power tool, having a spindle which is provided with a bevel gear (not shown) which drives bevel gear 84. This bevel gear is keyed to spindle 86 journaled in bearing 88 in the housing 82. The bevel gear 84 has a cylindrical extension or hub 90 in which a pair of opposed recesses 92 (FIG. 15) are provided. Lock pin 94 mounted in the housing, similar to that described previously, is manually movable against the bias of spring 96 to engage a recess if the blocking member 98 does not prevent access of the pin to the recess. It will be noted the lock pin in the construction shown in FIGS. 14-17 has a small diameter tip 100 while the pin 94 in the next two modifications does not have the small tip 100. The blocking member 98 shown in FIGS. 15-17 is likened to a spring clip in that it grips the hub and tends to rotate with the hub. At high speed rotation depression of the lock pin 94 simply causes the small diameter tip 90 to engage with the slot 102 on the left side of the open ends of the blocking member 98. This will force the blocking member to stop and let the hub or spindle lock 90 continue to rotate while preventing engagement with the hub recess. When manually rotated in reverse, however, the large diameter of the lock pin 94 will engage the straight edge 104. It will be noted that edge 104 has been bumped outwardly or crowned to be further from the center than will be the large diameter of the lock pin. Therefore, the lockout cannot move under the shoulder of the lock pin and prevent the lock pin from entering the hub recess 92.

The lockout design shown in FIGS. 18, 19 and 20 is also of the spring-grip type. In this arrangement the lock pin 94 does not have a reduced diameter tip and the lockout 106 has spaced ends (as necessary for the spring grip action) spaced far enough to allow the pin 94 to pass between. To the left (FIG. 18) there is a notch forming a blocking surface 108 which will be the surface engaged by the lock pin if the pin is depressed during clockwise rotation of the spindle at high speed. If the spindle is rotated in reverse manually, the lock pin will first drop off the surface 108 and eventually the blocking member will move from under the pin and so the pin can move into the space between the ends of the lockout 106 ready to drop into the recess in the spindle hub when in alignment.

The modification shown in FIGS. 21, 22 and 23 provides blocking member 110 with an outwardly projecting tab 112 which is engaged by the lock pin 94 if the pin is depressed during clockwise rotation at high speed. The tab is the blocking surface. If the spindle is rotated in reverse, the lock pin will simply ride on the outside surface of the lockout until it drops into the opening between the spaced ends of the lockout 110. This arrangement has the drawback that nearly a full revolution may be required before the lock pin can be brought into position to align with the opening between the ends and then may require further rotation to find the recess in the cylindrical hub. In all the other modifications the operator can find the opening in the locking member by simply rotating the spindle clockwise while depressing the lock pin to engage the blocking surface to the left of the vertical centerline any of FIGS. 2, 5, 8, 11, 15, or 18. When the tool stops and is manually reversed, the pin is immediately adjacent the opening in the locking member into which the pin must drop to find the recess. This speeds up finding the recess but this feature is unavailable in the construction shown in FIGS. 21, 22 and 23.

As previously indicated the prior art used a lock pin which engaged a hole only slightly bigger than the pin. This had no impacting capability. At operating speeds this could not be engaged particularly since the trailing portion of the hole was lowered. Users found, however, that depressing the pin while the tool was coasting to a stop could engage the pin at say 1,000 RPM or less without immediate damage although with cumulative damage. The present design provides the blocking surface which prevents such abuse. If not provided with the blocking surface the present design would still function to prevent engagement of the pin at high speed while retaining the impacting capability not found in the prior at. If that is satisfactory to the designer, all that is necessary is to keep the clearance small between the pin and the opening in the blocking member.

The spindle lock 30 and the cylindrical hub 90 are both, in effect, collars fixed on the spindle. Thus, with some housing redesign the modifications shown in FIGS. 2-13 could be used with the tool shown in FIG. 14 and the modifications shown in FIGS. 14-23 could be used with the tool shown in FIG. 1.

I claim:

1. A power tool comprisng,
a housing,
a spindle journaled in the housing,
a spindle lock member rotating with the spindle inside the housing,
a recess in the perimeter of the lock member having substantial angular embrace,
a lock pin reciprocably mounted in the housing for movement between an inactive position and an operative position in which it projects into said recess, means biasing the lock pin to its inactive position,
blocking means coaxial with the spindle and extending radially beyond the lock member into the path of movement of the lock pin to prevent movement of the lock pin to its operative position,
means biasing the blocking means into frictional engagement with the lock member so it normally rotates with the lock member but may be restrained from such rotation,
said blocking means having an opening therein permitting passage of the lock pin therethrough when the lock pin is aligned with the opening but precluding entry of the lock pin when the blocking means is rotating at high speed,
a major dimension of the cross-section of said lock pin being substantially less than the angular embrace of said recess whereby said spindle is capable of substantial angular movement relative to the lock pin when the lock pin is in its operative position to permit impacting the ends of the recess against the lock pin.

2. Apparatus according to claim 1 in which a blocking surface on said blocking means adjacent said opening and positioned to be engaged by the lock pin if the lock pin is depressed while the spindle is rotating in the normal direction, engagement of the lock pin with the blocking surface being operative to prevent the blocking means from rotation with the spindle in the normal direction and to prevent entry of the lock pin into said opening under such conditions, said blocking means rotating with the spindle when the spindle is rotated in reverse direction whereby the blocking surface is moved from under the lock pin and the lock pin can be aligned with and enter said opening for subsequent entry into said recess.

3. Apparatus according to claim 2 in which the blocking means is axially adjacent the lock member.

4. Apparatus according to claim 3 in which the lock member and the blocking member underlie the lock pin.

5. Apparatus according to claim 4 in which the blocking surface is on the trailing side of said opening when the spindle is rotating in said normal direction and is at a greater distance from the spindle center than the outer surface of the lock member and less distance than the outer surface of the blocking means from said center.

6. Apparatus according to claim 5 in which the blocking means includes a portion which extends axially over the lock member.

7. Apparatus according to claim 6 in which the blocking surface also extends axially over the lock member.

8. Apparatus according to claim 4 in which the blocking surface underlies the lock pin diameter and the lock pin has a reduced diameter tip which can clear the blocking surface and engage the blocking means.

9. Apparatus according to claim 2 in which the blocking means is mounted on and embraces the lock member.

10. Apparatus according to claim 9 in which the blocking means has a circumferential slot open to said opening on the trailing side of the opening when the spindle is rotating in said normal direction, and said lock pin has a reduced diameter tip which can enter said slot, the sides of the slot comprising the blocking surface and engaging the shoulder on the lock pin where the tip meets the lock pin.

11. Apparatus according to claim 9 in which the blocking surface is on the trailing side of said opening when the spindle is rotating in said normal direction and is at a greater distance from the spindle center than the outer surface of the lock member and less distance than the outer surface of the blocking means from said center.

12. Apparatus according to claim 9 in which the blocking surface comprises a tab projecting outwardly from the blocking means adjacent said opening on the leading side thereof when the spindle is rotating in said normal direction to pass under the lock pin when the lock pin is in its inactive position but to be engaged by the lock pin as it moves towards its operative position.

* * * * *